US012644487B2

(12) United States Patent  (10) Patent No.: US 12,644,487 B2
Rein et al.  (45) Date of Patent: Jun. 2, 2026

(54) LINEAR GUIDE

(71) Applicant: Festo SE & Co. KG, Esslingen (DE)

(72) Inventors: Bernd Rein, Bad Ditzenbach (DE);
Felix Mäckle, Esslingen (DE);
Alexander Maischberger,
Ostfildern-Nellingen (DE)

(73) Assignee: Festo SE & Co. KG, Esslingen (DE)

( * ) Notice: Subject to any disclaimer, the term of this
patent is extended or adjusted under 35
U.S.C. 154(b) by 33 days.

(21) Appl. No.: 18/798,165

(22) Filed: Aug. 8, 2024

(65) Prior Publication Data

US 2025/0052276 A1  Feb. 13, 2025

(30) Foreign Application Priority Data

Aug. 9, 2023  (DE) .......................... 102023121206.0

(51) Int. Cl.
*F16C 29/00* (2006.01)
*F16C 29/04* (2006.01)
(Continued)

(52) U.S. Cl.
CPC .......... *F16C 29/005* (2013.01); *F16C 29/004*
(2013.01); *F16C 29/063* (2013.01);
(Continued)

(58) Field of Classification Search
CPC .... F16C 29/004; F16C 29/005; F16C 29/048;
F16C 29/063; F16C 33/64; F16C
2226/40; F16C 2322/39
See application file for complete search history.

(56) References Cited

U.S. PATENT DOCUMENTS 5,067,823 A * 11/1991 Kasuga ................... F16C 33/64
384/49
2008/0253703 A1* 10/2008 Michioka ................ F16C 29/04
384/49
(Continued)

FOREIGN PATENT DOCUMENTS

CN  117927565 A * 4/2024  ............ F16C 29/005
DE  10 2008 051 682  4/2010
(Continued)

OTHER PUBLICATIONS

Office Action issued in corresponding German Patent Application
No. 10 2023 121 206.0, Feb. 29, 2024, 5 pages.

*Primary Examiner* — Alan B Waits
(74) *Attorney, Agent, or Firm* — HSML P.C.

(57) ABSTRACT

Linear guide having a profiled body extending along an axis
of movement and a carriage which is mounted on the
profiled body such that it can move linearly along the axis
of movement and which has a rolling bearing unit, which
bears with at least one rolling element against a guideway.
The guideway has two guide rails which are arranged in a
row along the axis of movement and which are each posi-
tively received on the profiled body in spatial directions
aligned transversely to the axis of movement, in which
mutually opposite end faces of the two guide rails delimit a
joint region and in each case adjacent to the joint region
between the respective guide rail and the profiled body a
material connection region is formed, which extends at most
over 10 percent of a total length of the respective guide rail
along the axis of movement.

9 Claims, 4 Drawing Sheets

(51) Int. Cl.
  *F16C 29/06*        (2006.01)
  *F16C 33/64*        (2006.01)
(52) U.S. Cl.
  CPC ............ *F16C 33/64* (2013.01); *F16C 29/048*
      (2013.01); *F16C 2226/40* (2013.01); *F16C*
                          *2322/39* (2013.01)

(56)                References Cited

U.S. PATENT DOCUMENTS

| | | | |
|---|---|---|---|
| 2010/0092114 A1 | 4/2010 | Albert | |
| 2010/0139426 A1* | 6/2010 | Mori ....................... | F16C 33/60 |
| | | | 74/89.32 |
| 2010/0260446 A1* | 10/2010 | Schroeder .............. | B23P 17/00 |
| | | | 384/7 |
| 2012/0128277 A1* | 5/2012 | Ju ......................... | F16C 29/048 |
| | | | 384/10 |
| 2017/0276174 A1* | 9/2017 | Greiner .................... | B23Q 3/15 |
| 2018/0355959 A1 | 12/2018 | Homma et al. | |
| 2020/0309238 A1* | 10/2020 | Homma ................ | F16C 29/005 |
| 2021/0355993 A1* | 11/2021 | Sato ........................ | F16C 29/08 |
| 2025/0067304 A1* | 2/2025 | Winkler ................ | F16C 29/005 |

FOREIGN PATENT DOCUMENTS

| | | | | |
|---|---|---|---|---|
| DE | 202017003846 U1 * | 10/2017 | ............ | F16C 29/082 |
| DE | 11 2016 005 460 T5 | 8/2018 | | |
| KR | 20210141907 A * | 11/2021 | ............ | F16C 29/005 |

* cited by examiner

LINEAR GUIDE

The invention relates to a linear guide with a carriage which is guided in linear motion on a profiled body for converting a rotational movement of a drive motor into a linear movement of a carriage.

A linear guide is used by the applicant, for example, in a linear drive which is marketed under the designation ELGD and which can be used in the field of automation technology to convert a rotational movement of a rotary drive such as a pneumatic motor or an electric motor into a linear movement of a carriage. The carriage can, for example, be equipped with a workpiece carrier in order to move a workpiece from a pick-up position to a delivery position in the course of a linear movement.

SUMMARY OF INVENTION

The task of the invention is to provide a linear guide with which a large movement path for the carriage can be realized.

This task is solved in that the linear guide has a profiled body extending along an axis of movement and a carriage, wherein the carriage is mounted on the profiled body so as to move linearly along the axis of movement and has a rolling bearing unit which bears against a guideway or guide track with at least one rolling element, wherein the guideway has two guide rails which are arranged in a row along the axis of movement and are each received in a form-fitting manner on the profiled body in spatial directions aligned transversely to the axis of movement, wherein mutually opposite end faces of the two guide rails delimit an abutment region and wherein in each case adjacent to the abutment region between the respective guide rail and the profiled body a material connection region is formed which extends at most over 10 percent of a total length of the respective guide rail along the axis of movement and in which a material connection is formed between the guide rail and the profiled body.

The profiled body forms the basic structure for the linear guide and is the component of the linear guide that can be attached to a machine frame, for example, in order to provide the linear movement of the carriage there, for example for a workpiece transfer between a pick-up position for the workpiece and a delivery position for the workpiece. The profiled body has the task of guiding the carriage along the axis of movement with linear movement and with as little play as possible, so that the carriage preferably has exactly one degree of freedom of movement in relation to the profiled body, which degree of freedom is aligned along the axis of movement. Furthermore, the profiled body has the task of transferring the forces acting on the carriage to the machine frame, wherein these forces are transferred from the carriage to the guide rails via the at least one roller bearing unit and from the guide rails to the profiled body and from the profiled body to the machine frame. The rolling bearing unit can, for example, be at least one recirculating ball bearing guide, also known as a rolling bearing shoe. In a recirculating ball bearing guide of this type, several bearing balls are accommodated in a housing and are held there on an oval track by suitable guide means, whereby the bearing balls protrude beyond the housing on one surface of the recirculating ball bearing guide and rest against the guide rail.

In addition, the profiled body has the task of providing an interface for attaching a rotary drive such as a pneumatic motor or an electric motor, whereby a rotary movement of the drive can be converted into the desired linear movement, for example with a toothed belt mounted movably on the profiled body or with a threaded spindle mounted movably on the profiled body. Accordingly, a further task of the profiled body is to establish the flow of force between the drive and the carriage and thus to drain off the reaction forces that occur due to an interaction between the drive and the carriage.

Depending on the length of the profiled body, which is typically in an interval between 10 cm and 600 cm, it may be necessary to arrange several guide rails in series along the axis of movement, as the guide rails are only available in a limited length due to the way they are manufactured. As an example, two guide rails are arranged in a row on the profiled body when the profiled body is 400 cm long. The problem here is that although the guide rails are positively connected to the profiled body in all spatial directions transverse to the axis of movement due to their profile and a corresponding profile of the profiled body, they must have a certain degree of freedom of movement in the direction of the axis of movement. This degree of freedom of movement in the direction of the longest extension of the guide rails is necessary in order to enable compensation between the typically different expansions of the profiled body and the guide rails in the event of temperature changes acting on the linear guide, whereby the differences in expansion are greatest in the direction of the axis of movement, as this is also the extension of the profiled body and guide rails, which is many times greater than an extension of the profiled body and the guide rail in spatial directions transverse to the axis of movement.

In order to ensure that the two guide rails are reliably fixed to the profiled body, it is provided that the guide rails are each connected to the profiled body in a regionally material-locking manner adjacent to a joint region, which is defined by opposing end faces of the two guide rails. This material-locking connection between the respective guide rail and the profiled body, which is only formed in certain areas along the axis of movement, ensures that the respective guide rail can move largely freely relative to the profiled body along the axis of movement away from the material locking area formed by the material-locking connection, so that no internal stresses occur between the profiled body and the guide rail in the event of temperature changes and associated expansion changes for the profiled body and the respective guide rail. Furthermore, the material connection area ensures that a guideway formed by the two guide rails and intended for contact with the rolling elements has no offset in the abutment region that could impair the rolling movement of the rolling bearing unit. Rather, the material connection area is designed in such a way that there is a gap between the two guide rails in the abutment region, which is of negligible size both at room temperature and at deviating ambient temperatures in the context of intended use of the linear guideway.

In order to ensure free movement of the respective guide rail over as large an extension as possible along the axis of movement, it is intended that an extension of the material connection area is not greater than 10 percent of a total length of the respective guide rail along the axis of movement. Preferably, it is provided that the material connection area extends over a maximum length of 8 cm, preferably 6 cm, in particular 4 cm, starting from the abutment region.

Advantageous further embodiments of the invention are the subject of the subclaims.

It is useful if the material connection area between the profiled body and the respective guide rail is designed as an adhesive joint. This makes it possible to freely select the positioning of the abutment region, since no additional mechanical requirements need to be provided on the profiled body and/or on the guide rails for such a design of the material connection area, as would be necessary, for example, if the opposing end regions of the guide rails were fixed by fastening means such as screws. Furthermore, an advantageous expansion compensation between the profiled body and the guide rail for the material connection area can be ensured by a suitable selection of the adhesive that is used to create the adhesive joint or bonding point, so that any tensions between the profiled body and the guide rail that occur in the event of temperature changes can be limited to a minimum, as these are compensated for by the adhesive, which preferably has a residual elasticity.

It is preferable that the guide rail is designed with a constant rail profile along the axis of movement and has a guide area for contact with rolling elements and a contact area for contact with contact surfaces of the profiled body, whereby the contact area has a support area facing away from the guide area and clamping areas adjacent to the support area on both sides, which each form an acute angle with the support area. As an example, the guide rail has a rail profile in a cross-sectional plane aligned transversely to the axis of movement, which rail profile is at least essentially mirror-symmetrical and in which the guide area has a recess profiled in the shape of a circular section at each edge, which can be used for rolling a bearing ball. A contact area is formed on a rear side of the guide rail facing away from the guide area, which is designed for the positive coupling between the guide rail and the profiled body. For this purpose, the contact area comprises a support area, which can also be referred to as the rear side of the guide area and which is provided for contact with corresponding contact surfaces of the profiled body. Preferably, the support area is flat or at least has flat sections. Clamping areas are formed on both sides adjacent to the support area, each of which forms an acute angle with the support area. The alignment of the clamping areas ensures an advantageous transmission of force between the carriage and the roller bearing unit attached to it, the guide rail and the profiled body. As an example, the profile of the guide rail in the cross-sectional plane can be described by an envelope curve in the form of a rhombus.

In a further development of the invention, it is provided that the profiled body is designed with a constant body profile along the axis of movement and has a receiving recess for receiving the guide rails, wherein the receiving recess has two contact surfaces arranged at a distance from one another, preferably aligned parallel to one another, in particular arranged in a common plane, and two clamping surfaces each aligned at an acute angle to the contact surfaces. A receiving area of the profiled body provides a form-fit reception of the guide rail and has a body profile in a cross-sectional plane aligned transversely to the axis of movement, which at least almost corresponds to the profile of the guide rail. It is particularly preferred that the body profile in the receiving area is designed in such a way that the guide rail can initially be pushed into the receiving area with low friction along the axis of movement starting from an axial end face of the profiled body and then a local deformation of the receiving area is carried out in order to thereby ensure the positive fixing of the guide rail in all spatial directions away from the axis of movement on the profiled body.

In a further embodiment of the invention, it is provided that a first cavity is formed between the contact surfaces of the profiled body and the guide rail and that a second cavity is formed between the respective contact surface and the adjacent clamping surface together with the guide rail, wherein the first cavity and/or the second cavity is/are filled with a connecting material, in particular with an adhesive, in the material connection area. By using at least one of the cavities to accommodate a connecting material, in particular an adhesive, it is ensured that a material thickness for the connecting material is sufficient to be able to ensure expansion compensation between the profiled body and the guide rail. Preferably, several of the cavities are provided with the connecting material in order to ensure a reliable fixation between the guide rail and the profiled body, whereby an extension of the material connection area along the axis of movement is selected to be as short as possible.

It is useful if two guideways are assigned to the profiled body, which are arranged at a distance from each other in a spatial direction transverse to the axis of movement. In particular the two guideways are arranged like mirror images related to a mirror plane containing the axis of movement. This enables advantageous mounting of the carriage on both sides using at least two roller bearing units and the associated guide rails. It is particularly advantageous if a first abutment area for a first guideway, which comprises at least two guide rails, is formed along the axis of movement at a different position than a second abutment area for a second guideway, which is arranged opposite the first guideway. This prevents the carriage from passing both impact areas simultaneously when moving along the axis of movement.

It is preferable that the profiled body is made of aluminum and that the guide rails are made of steel. This allows the profiled body to be manufactured using an aluminum extrusion process, which is a cost-effective way of manufacturing complex profiled bodies. The use of steel for the guide rails is advantageous with regard to the fatigue strength requirements to be met, especially as the bearing balls of the roller bearing unit are also made of steel, thereby ensuring a particularly advantageous rolling pairing between the bearing balls and the guide rails.

In an advantageous further development of the invention, it is provided that the carriage has a spindle nut and a threaded spindle, which is mounted on the profiled body so that it can rotate, extends along the axis of movement and passes through the spindle nut. In this embodiment, the linear guide forms a linear drive for converting a rotational movement into a linear movement. For this purpose, a drive axis of a drive is aligned parallel to the axis of movement. This means that a rotational movement of the drive axis can be transmitted via a coupling arranged on the front of the profiled body to the threaded spindle, which extends along the axis of movement and is rotatably mounted on the profiled body. The rotational movement of the threaded spindle is converted into a translational movement via a spindle nut assigned to the carriage, which engages with an internal thread in an external thread of the threaded spindle.

Alternatively, the carriage can be coupled to an upper run or a lower run of a toothed belt, which extend along the axis of movement, whereby a pulley mounted on the profiled body so that it can rotate is arranged at opposite end areas of the profiled body. In this case, the linear guide forms a linear drive for converting a rotational movement into a linear movement. Here, a drive axis of a drive is aligned transversely to the axis of movement and is connected to a first belt pulley that is rotatably mounted on the profiled body, around which the toothed belt wraps at least in some areas and which can be designed in particular as a toothed belt pulley with external teeth. Furthermore, a second belt pulley, which can be designed as a deflection pulley or a toothed belt pulley, for example, is mounted on the profiled body so that it can rotate, is arranged at a distance along the axis of movement opposite the first belt pulley and is also wrapped around by the toothed belt in some areas.

It is useful if the two guide rails are connected to the profiled body in an exclusively form-fit manner away from the respective material connection area. This ensures that the guide rails each have a single, almost point-like connection with the profiled body with regard to their fixation in the direction of the axis of movement and are freely movable over the rest of their extension along the axis of movement, if one disregards friction effects between the guide rail and the profiled body, which can result from the positive fixation of the guide rail on the profiled body in all spatial directions away from the axis of movement.

BRIEF DESCRIPTION OF THE DRAWINGS

An advantageous embodiment of the invention is shown in the drawing.

DETAILED DESCRIPTION OF INVENTION

Figure 1:
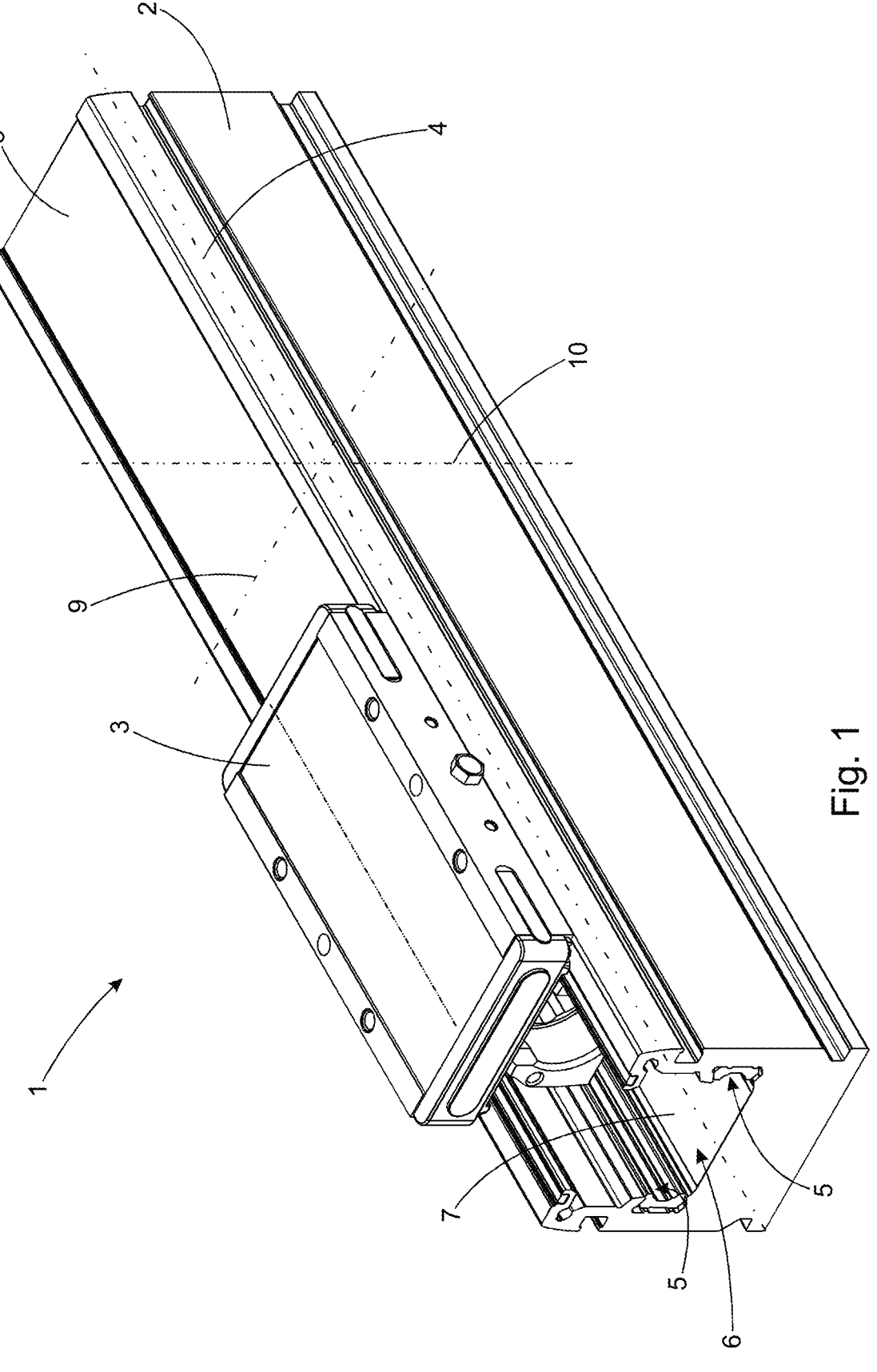
FIG. 1 shows a linear guide with a profiled body and a carriage mounted on the profiled body for linear movement.

A linear guide 1 shown in FIG. 1 comprises a profiled body 2 designed purely as an example as an extruded aluminum part, which extends with a constant profile along an axis of movement 4 and on which a carriage 3 is mounted for linear movement along the axis of movement 4. In order to ensure a low-backlash, in particular a backlash-free, linearly movable mounting of the carriage 3 relative to the profiled body 2, guideways 5 are formed on the profiled body 2, arranged opposite one another purely by way of example, which are provided for a rolling movement of rolling elements 76 of a rolling bearing unit 74 shown schematically in FIGS. 2 and 3.

For the linearly movable mounting of the carriage 3, it is provided that the carriage 3 projects in some areas into a recess 6 of the U-shaped profiled body 2, the guideways 5 being arranged purely by way of example adjacent to a base surface 7 of the recess 6. Furthermore, it is provided that the carriage 3 is in mechanical contact with the profiled body 2 exclusively via the rolling elements 76, while all other areas of the carriage 3 are arranged with a movement gap, not shown in detail, relative to the profiled body 2. In order to prevent dirt from entering the recess 6, a cover strip 8 is provided which closes the recess 6 and which can be lifted from the carriage 3 so as not to impede the linear movement of the carriage 3 along the axis of movement 4. By way of example only, the cover strip 8 is shown in the rear area of the profiled body 2, while the cover strip 8 is not shown in the front area of the profiled body 2, in particular to visualize the positioning of the guideways 5.

The linear guide 1 shown in FIG. 1 can optionally be equipped with a spindle drive or a toothed belt drive in order to produce the desired linear movement of the carriage 3 relative to the profiled body 2.

Figures 2, 3:
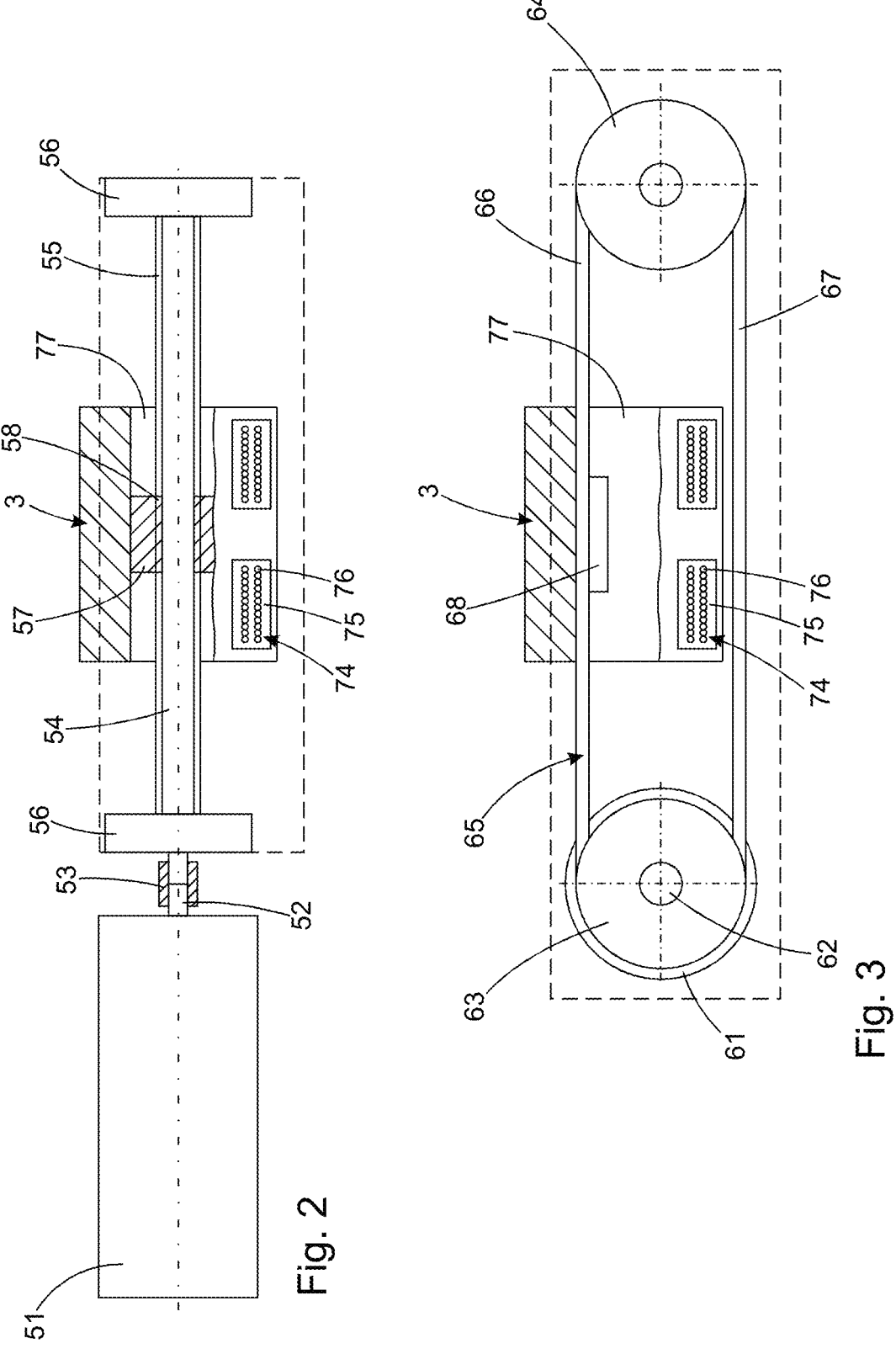
FIG. 2 shows a strictly schematic representation of a first embodiment, also known as a spindle drive, of a drive mechanism for initiating a linear movement on the carriage as shown in FIG. 1.
FIG. 3 shows a strictly schematic representation of a second embodiment, also known as a toothed belt drive, of a drive mechanism for initiating a linear movement on the carriage as shown in FIG. 1, FIGS. 4A and 4B show an enlarged representation of a body profile of the profiled body according to FIG. 1 with a detailed representation of the guide rail accommodated thereon.

FIG. 2 shows a purely exemplary and purely schematic embodiment of a drive mechanism designed as a spindle drive, which is merely intended to illustrate how such a spindle drive can be constructed in principle. As can be seen from the illustration in FIG. 2, a drive motor 51, which can be designed as a pneumatic motor or an electric motor, for example, has a drive shaft 52. By applying energy to the drive motor 51 the drive shaft 52 provides a rotational movement. It is provided that an axis of rotation de of the drive shaft 52 is identical to the axis of movement 4. The drive shaft 52 is non-rotatably connected to a threaded spindle 54 via a coupling 53, so that a rotational movement of the drive shaft 52 leads to an identical rotational movement of the threaded spindle 54. The threaded spindle 54 has an external thread 55 and is rotatably mounted in a spindle bearing 56 at opposite end regions. Each of the spindle bearings 56 can be fastened to or in the profiled body 2, so that the threaded spindle 54 is mounted on the profiled body 2 so that it can only rotate.

The carriage 3, which is shown in a partial sectional view and only shown strictly schematically in comparison with the representation in FIGS. 1 and 2, is equipped in a lower region with two rolling bearing units 74, which are arranged at a distance from one another along the axis of movement 4 and each comprise a bearing housing 75 and rolling elements 76 accommodated therein and which are each designed as a recirculating ball bearing guide. The task of the rolling bearing units 74 is to ensure both a backlash-free or at least largely low-backlash linear bearing of the carriage 3 on the profiled body 2 and torque support for torques acting on the carriage 3 around the axis of movement 4. For this purpose, the two rows of rolling elements 76 of the respective rolling bearing units 74 come into contact with the guideways 5 in the profiled body 2, as shown in more detail in FIGS. 1 and 3.

The carriage 3 has a recess 77 in which a spindle nut 57 is accommodated, which is connected to the carriage 3 and which engages with an internal thread 58 in the external thread 55. Due to the linear movement of the carriage 3 relative to the profiled body 2 and the torque support for the carriage 3 relative to the profiled body 2 provided by the roller bearing units 74, a rotational movement of the threaded spindle 54 about the axis of movement 4 results in a linear movement of the carriage 3 along the axis of movement 4.

FIG. 3 shows a purely exemplary and purely schematic embodiment of a drive mechanism designed as a toothed belt drive, which is merely intended to illustrate how such a toothed belt drive can be constructed in principle. Here it is provided that a first belt pulley 63 is attached to a drive shaft 62 of a drive motor 61, whereby the drive shaft 62 is aligned transversely to the axis of movement 4. Like a second pulley 64, the first pulley 63 is attached to the profiled body 2, which is not shown in detail, in a rotatable manner. Furthermore, it is provided that a toothed belt 65 wraps around both the first pulley 63 and the second pulley 64 by approximately 180°. A toothing of the toothed belt engages in a toothing of the two pulleys 63 and 64. An upper run 66 of the toothed belt 65 is guided through the recess 77 of the carriage 3 and fastened to an upper side of the recess 77. A fastening plate 68 is provided for this purpose, which engages in the toothing of the toothed belt 65 and which is connected to the carriage 3, for example with screws. A lower run 67 of the toothed belt 65 is guided underneath the carriage 3.

Both with the drive mechanism as shown in FIG. 2 and with the drive mechanism as shown in FIG. 3, the carriage 3 can be displaced linearly along the axis of movement 4 relative to the profiled body 2. In order to ensure the above-described backlash-free or at least low-backlash mounting of the carriage 3 relative to the profiled body 2, the opposing guideways 5 are each designed as guide rails 31, as shown in detail in the illustration in FIGS. 4A and 4B. The guide rail 31 is preferably made of steel and has a rail profile 32 in a cross-sectional plane aligned transversely to the axis of movement 4, which corresponds to the plane of representation in FIGS. 4A and 4B, which can be divided functionally into a guide area 33 and a contact area 34.

The guide area 33 is manufactured with high precision, in particular as a ground surface, and serves to support the rolling elements 76 of the respective rolling bearing unit 74. Adjacent to the guide area 33 extends a contact area 34, which is provided for a positive fit in a correspondingly designed receiving recess 23 of the profiled body 2 and which may also be designed with high precision, in particular ground, at least in some areas.

Figures 4A, 4B:

As can be seen from the illustration in FIGS. 4A and 4B, the guide area 33 has rolling surfaces 41 which are designed in the shape of a circular section and aligned mirror-symmetrically to a mirror plane 40 and which are provided for the rolling movement of the rolling elements 76.

The contact area 34 comprises a support area 35 and two clamping areas 36 and 37 arranged between the guide area 33 and the support area 35. As an example, it is provided that the support area 35 has two spaced-apart support surfaces 42, 43 lying in a common plane, which are designed to bear against corresponding contact surfaces 24, 25 of the profiled body 2. Adjacent to the support surfaces 42, 43 extend the clamping areas 36, 37, which each have prismatic surfaces 44, 45 aligned at an acute angle to one another, the prismatic surfaces 44, 45 each being aligned at an acute angle 38, 39 to the support surfaces 42, 43. These prismatic surfaces 44, 45 can be enveloped by a rhombic envelope geometry, shown as a dashed line, purely by way of example, as shown in the detailed representation in FIGS. 4A and 4B. The prismatic surfaces arranged adjacent to the guide area 33 are designed for flat contact with the clamping surfaces 26, 27 of the profiled body 2. It is preferable that for mounting the guide rail 31 there is initially still a distance, not shown, between the clamping area 36 and the oppositely arranged clamping surface 26, so that the guide rail 31 can be pushed into the receiving recess 23 of the profiled body 2 with little friction. In order to ensure a form-fit fixing of the guide rails 31 in all spatial directions, a plastic deformation of the projection 28, on the underside of which the clamping surface 26 is formed, is carried out at a later point in time, whereby the distance between the clamping surface 26 and the clamping area 36 is reduced to zero.

Figures 5A, 5B:
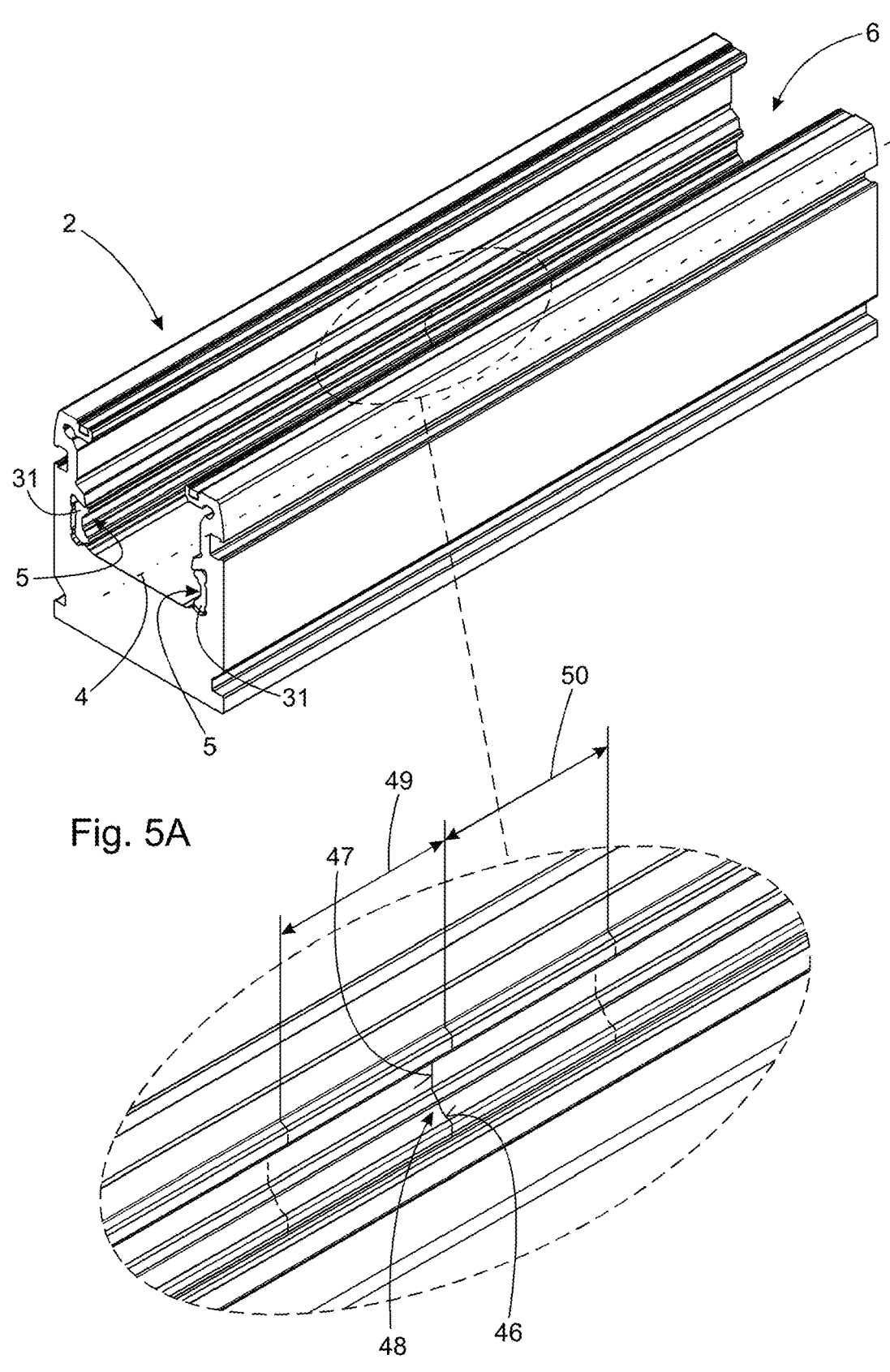
FIGS. 5A and 5B show a perspective view of the profiled body as shown in FIG. 1 with two guide rails arranged in series and an abutment region formed between the guide rails as well as a detailed view of the abutment region.

FIGS. 5A and 5B shows the profiled body 2 with the guide rails 31 accommodated therein, wherein the guideway 5, which is fully visible due to the perspective view, is formed by two guide rails 31 arranged in series one behind the other along the axis of movement 4. As can be seen from the detailed representation in FIGS. 5A and 5B, the two guide rails 31 border each other with opposing end faces 46, 47 in a joint region 48. Starting from the abutment region 48, material connection areas 49, 50, in which a material connection is formed between the respective profile rail 31 and the profiled body 2, extend in both directions along the axis of movement 4 and are shown only schematically.

It is preferably provided that this material connection is created in the respective material connection area 49, 50 by filling a first cavity 91 and/or a second cavity 92 and/or a third cavity 93 with a hardenable shapeless mass, preferably an adhesive, in particular a 2-component epoxy resin adhesive, in order to thereby achieve the desired material connection between the guide rails 31 and the profiled body 2.

As can be seen from the illustration in FIGS. 5A and 5B, the two material connection areas 49, 50 are formed directly adjacent to the abutment region 48, while no material connection is provided between the guide rails 31 and the profiled body 2 away from the material connection areas 49, 50.

In a variant of a linear guide that is not shown, a section is formed between the two material connection areas, in particular at the level of the abutment region 48, in which there is no material connection between the guide rail and the profiled body.

The invention claimed is:

1. A linear guide, comprising:
a profiled body extending along an axis of movement; and
a carriage which is mounted on the profiled body such that it can move linearly along the axis of movement,
wherein the carriage has a rolling bearing unit, which bears with at least one rolling element against a guideway,
wherein the guideway has two guide rails which are arranged in a row along the axis of movement and which are each positively received on the profiled body in spatial directions aligned transversely to the axis of movement,
wherein mutually opposite end faces of the two guide rails delimit an abutment region, and
wherein a material connection region is formed between the respective guide rail and the profiled body in each case adjacent to the abutment region, wherein the material connection region extends over a maximum of 10 percent of a total length of the respective guide rail along the axis of movement and in which a material connection is formed between the guide rail and the profiled body.

2. The linear guide according to claim 1, wherein the material connection region between the profiled body and the respective guide rail is an adhesive joint.

3. The linear guide according to claim 1, wherein at least one of the guide rails is designed with a constant rail profile along the axis of movement and has a guide area for contact with the at least one rolling element and a contact area for contact with contact surfaces of the profiled body, the contact area having a support area facing away from the guide area and clamping areas which adjoin the support area on both sides and which each form an acute angle with the support area.

4. The linear guide according to claim 1, wherein the profiled body is designed with a constant body profile along the axis of movement and has a receiving recess for receiving the two guide rails, the receiving recess having two contact surfaces arranged at a distance from one another and two clamping surfaces each aligned at an acute angle to the contact surfaces.

5. The linear guide according to claim 4, wherein a first cavity is formed between the contact surfaces of the profiled body and the respective guide rail and wherein between the respective contact surface and the adjacent clamping surface together with the guide rail, a second and/or third cavity is formed, the first cavity and/or the second and/or third cavity being filled with a connecting material in the material connection region.

6. The linear guide according to claim 1, further comprising a second guideway, wherein the guideway and the second guideway are assigned to the profiled body, which are arranged at a distance from one another in a spatial direction transverse to the axis of movement.

7. The linear guide according to claim 1, wherein the profiled body is made of aluminum and that the two guide rails are made of steel.

8. The linear guide according to claim 1, wherein the carriage has a spindle nut through which a threaded spindle, which is mounted on the profiled body so as to be rotatable and extends along the axis of movement, passes.

9. The linear guide according to claim 1, wherein the carriage is coupled to an upper run or a lower run of a toothed belt, which extend along the axis of movement, a belt pulley mounted rotatably on the profiled body being arranged in each case at opposite end regions of the profiled body.

\* \* \* \* \*